US011238866B2

(12) United States Patent
Siddoway et al.

(10) Patent No.: US 11,238,866 B2
(45) Date of Patent: Feb. 1, 2022

(54) INTELLIGENT ALERTING OF INDIVIDUALS IN A PUBLIC-SAFETY COMMUNICATION SYSTEM

(71) Applicant: MOTOROLA SOLUTIONS, INC., Chicago, IL (US)

(72) Inventors: Craig F Siddoway, Davie, FL (US); Srividya G Subramanyam, South Barrington, IL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 449 days.

(21) Appl. No.: 16/442,593

(22) Filed: Jun. 17, 2019

(65) Prior Publication Data
US 2020/0395017 A1 Dec. 17, 2020

(51) Int. Cl.
G10L 15/26 (2006.01)
G06F 16/635 (2019.01)
G06F 16/68 (2019.01)
H04W 4/06 (2009.01)
H04W 4/12 (2009.01)

(52) U.S. Cl.
CPC ............ G10L 15/26 (2013.01); G06F 16/635 (2019.01); G06F 16/686 (2019.01); H04W 4/06 (2013.01); H04W 4/12 (2013.01)

(58) Field of Classification Search
CPC .. G06F 16/3329; G06F 16/635; G06F 16/686; G06F 16/9537; G06F 40/295; G08B 17/08; G10L 15/26; H04L 51/32; H04L 65/1006; H04L 67/18; H04W 4/06; H04W 4/08; H04W 4/10; H04W 4/12; H04W 76/50; H04W 4/14; G06N 3/0454; G06Q 30/0273; H04N 7/186

USPC ............. 340/539.13; 370/329; 375/259; 379/88.01, 106.02; 704/235, 270; 715/706; 345/646; 455/90.2, 404.2, 455/412.1, 412.2; 709/206
See application file for complete search history.

(56) References Cited

U.S. PATENT DOCUMENTS

| 8,117,064 B2 | 2/2012 | Bourne et al. | |
| 8,639,513 B2 * | 1/2014 | Opaluch | G10L 15/26 704/270 |
| 8,731,919 B2 * | 5/2014 | George | G10L 15/19 704/235 |
| 9,218,819 B1 | 12/2015 | Stekkelpak et al. | |

(Continued)

OTHER PUBLICATIONS

The International Search Report and the Written Opinion corresponding serial No. PCT/US2020/035904 filed: Jun. 3, 2020, dated Sep. 16, 2020, all pages.

Primary Examiner — Gerald Gauthier

(57) ABSTRACT

A method and apparatus for intelligently alerting individuals within a public-safety communication system is provided herein. During operation a query result is determined to have certain keywords. When this happens, prior conversations of individuals over various talkgroups are analyzed. The query terms and/or the query result are compared to the prior conversations, and a determination is made if any prior conversations are relevant to the query terms and/or the query results. If so, identities are determined for those individuals who were involved in the relevant prior conversations, and a notification of the results of the query are sent to electronic devices associated with the individuals who were involved in the relevant prior conversations.

13 Claims, 2 Drawing Sheets

(56) References Cited

U.S. PATENT DOCUMENTS

| | | | |
|---|---|---|---|
| 10,418,036 B1* | 9/2019 | Roturier | G06F 40/295 |
| 10,958,599 B1* | 3/2021 | Penov | G06F 16/285 |
| 2002/0172335 A1* | 11/2002 | Narasimhan | G06Q 10/00 |
| | | | 379/106.02 |
| 2009/0174547 A1* | 7/2009 | Greene | G08B 21/0476 |
| | | | 340/539.13 |
| 2009/0306981 A1* | 12/2009 | Cromack | G06F 16/685 |
| | | | 704/235 |
| 2010/0202597 A1* | 8/2010 | Koenigs | G10L 15/26 |
| | | | 379/88.01 |
| 2011/0092172 A1* | 4/2011 | Stille | H04W 76/45 |
| | | | 455/90.2 |
| 2012/0059651 A1* | 3/2012 | Delgado | H04W 4/80 |
| | | | 704/235 |
| 2012/0265528 A1* | 10/2012 | Gruber | G10L 15/183 |
| | | | 704/235 |
| 2013/0148752 A1* | 6/2013 | Kumhyr | H04L 27/00 |
| | | | 375/259 |
| 2014/0273978 A1* | 9/2014 | Van Snellenberg | H04W 4/02 |
| | | | 455/412.2 |
| 2015/0074524 A1* | 3/2015 | Nicholson | G06F 3/167 |
| | | | 715/706 |
| 2015/0195406 A1 | 7/2015 | Dwyer et al. | |
| 2015/0310730 A1 | 10/2015 | Miller et al. | |
| 2015/0312401 A1* | 10/2015 | Liang | H04W 8/183 |
| | | | 455/412.1 |
| 2015/0371636 A1* | 12/2015 | Raedel | H04M 3/2281 |
| | | | 704/235 |
| 2016/0037319 A1* | 2/2016 | Hafeman | H04W 4/90 |
| | | | 455/404.2 |
| 2016/0127291 A1* | 5/2016 | Kassab | H04L 12/1859 |
| | | | 709/206 |
| 2016/0132990 A1* | 5/2016 | Zhang | G09G 5/00 |
| | | | 345/646 |
| 2016/0307284 A1* | 10/2016 | Parsons | G06Q 10/1097 |
| 2016/0381720 A1* | 12/2016 | Baek | H04W 8/14 |
| | | | 370/329 |
| 2017/0185375 A1* | 6/2017 | Martel | G06F 40/279 |
| 2017/0289776 A1* | 10/2017 | Kim | H04W 76/45 |
| 2018/0098206 A1* | 4/2018 | Nguyen | H04L 51/12 |
| 2019/0012341 A1 | 1/2019 | Proctor et al. | |
| 2019/0014602 A1* | 1/2019 | Gan | H04W 4/10 |
| 2019/0109909 A1* | 4/2019 | Sangameshwara | |
| | | | H04L 65/4061 |
| 2019/0174289 A1* | 6/2019 | Martin | H04L 67/18 |
| 2019/0306100 A1* | 10/2019 | Guthery | G10L 15/26 |
| 2020/0015058 A1* | 1/2020 | Wu | H04L 67/306 |
| 2020/0066126 A1* | 2/2020 | Voor | H04L 63/0428 |
| 2020/0279459 A1* | 9/2020 | Singh | G10L 15/16 |
| 2020/0395017 A1* | 12/2020 | Siddoway | H04L 67/327 |

* cited by examiner

INTELLIGENT ALERTING OF INDIVIDUALS IN A PUBLIC-SAFETY COMMUNICATION SYSTEM

BACKGROUND OF THE INVENTION

Modern two-way radio systems feature talkgroup creation where it is possible for a radio to be a member of any combination of talkgroups. As a member of a talkgroup, a radio may receive transmissions from, as well as transmit to all members of the talkgroup. Transmission and reception of information to radios outside of an assigned talkgroup is generally not performed. Illustratively, a radio assigned to an ambulance may be a member of a Fire & Rescue talkgroup as well as a Law Enforcement talkgroup. Therefore, the radio may communicate with all members of the Fire & Rescue talkgroup as well as the Law Enforcement talkgroup.

During operation, dozens of users may be listening and occasionally talking about different topics/incidents on a single talkgroup. Typically, only a few individuals will be talking about a particular topic/incident. Currently there is no automatic, practical, and selective way to alert the few users that were talking together about a topic/incident of interest (e.g., a topic of conversation) without alerting everyone on the talkgroup. This may lead to many individuals receiving an unnecessary notification over the talkgroup.

Consider the example where a first responder is on a group conversation with a dispatch operator and other users. The first responder may step away from the talkgroup to trigger a query on a private channel (talkgroup). For example, the first responder may enter a license plate number into an automated system to receive information about an automobile or its occupants. Any results from the search request will be received over the private channel so to not bother other individuals with unnecessary information.

However, when the query results comprise important information (e.g., occupant is armed, occupant is wanted, automobile was involved in a robbery, . . . , etc.), it would be beneficial if other relevant individuals were also notified of the information so they may assist the first responder. It is unnecessary to notify everyone listening on a talkgroup of the important information, since some individuals on the talkgroup will not be able to assist the first responder performing the query.

In current public-safety communication systems, the first responder would have to switch from the private channel to signal assistance to the dispatcher. Information about the search results would have to be provided to the dispatch operator in order to be disseminated to relevant individuals. The dialogue exchange would result in losing valuable seconds from getting that immediate assistance.

BRIEF DESCRIPTION OF THE SEVERAL VIEWS OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention.

Figure 1:
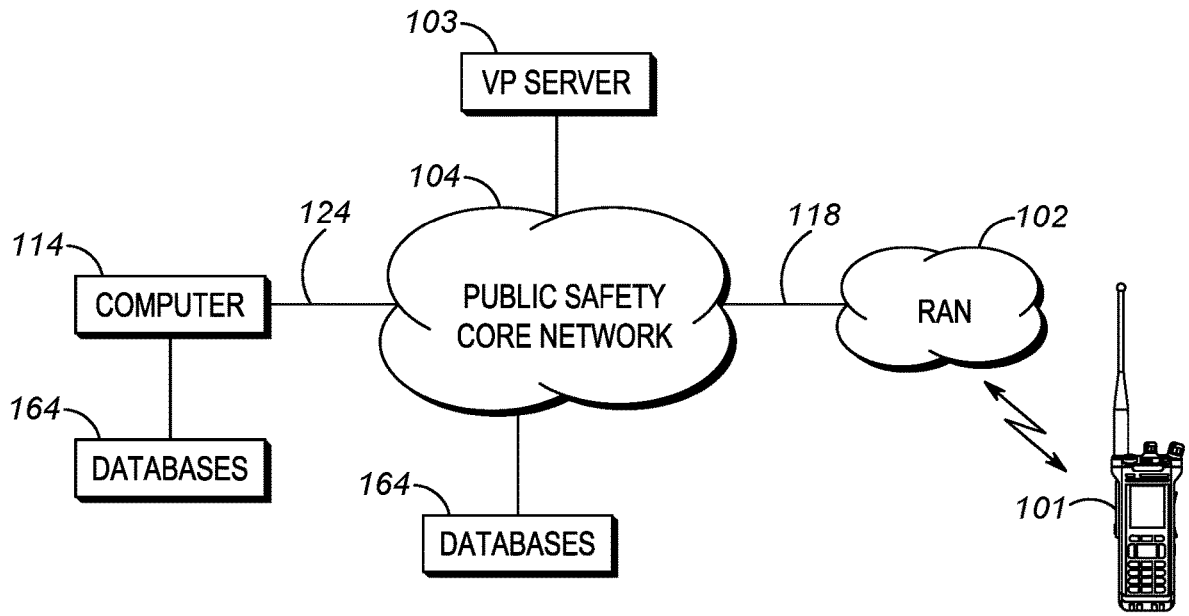
FIG. 1 shows a general operating environment of the present invention.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required.

DETAILED DESCRIPTION

In order to address the above-mentioned need, a method and apparatus for intelligently alerting individuals within a public-safety communication system is provided herein. During operation a query result is determined to have certain keywords. When this happens, prior conversations of individuals over various talkgroups are analyzed. The query terms and/or the query result are compared to the prior conversations, and a determination is made if any prior conversations are relevant to the query terms and/or the query results. If so, identities are determined for those individuals who were involved in the relevant prior conversations, and a notification of the results of the query are sent to electronic devices associated with the individuals who were involved in the relevant prior conversations.

The prior conversations of the individuals are stored in an electronic database and comprise prior group audio session records captured in the past, each group audio session record including a start time, an end time, identities of active participants, and a speech-to-text transcript of the speech audio exchanged between the individuals between the start and end times. These group conversations are obtained from all over-the-air transmissions by users of various talkgroups.

The start time and end time of the conversations may be used to purge old conversations from the system.

The query terms and/or the query results will be compared to the prior conversations by cross-referencing one or both of the query terms and the results of the query with the speech-to-text transcripts in each of the group audio session records and finding a group audio session record related to the query terms and/or the query results. This may simply comprise the step of finding a particular word common among the group audio session record and the query search results, or query search. Alternatively, this may comprise a more complex step of analyzing the group audio session record for prior phrases, words, and intent, and determining a relevance among the group audio session record and the query/query results.

Each group audio session is a portion of a conversation over a conventional or trunked group audio talkgroup channel, where start and end times determine distinct conversations as a function of one or more of detected silence on the group audio talkgroup channel, floor control information on the group audio talkgroup channel, and text analysis of the speech-to-text transcripts.

As an example of the above, consider Officer Fred discussing a potential suspect of a crime with Officer Smith over a talkgroup. At a later time, the Officer Fred initiates a digital assistant (virtual partner) conversation to look up license plate "H73 5364" on a private channel (no others can hear the query or results). For example, the officer might ask the virtual partner, "license plate lookup H73 5364". The virtual partner determines and notifies Officer Fred that the driver is the potential suspect of the crime and may be armed and dangerous. The virtual partner compares the query result to prior conversations had by the police officer, and determines that Officer Fred was discussing the suspect with Officer Smith. An alert will then be sent to Officer Smith of this hot hit with the details behind the hot hit. The alert will comprise a private message sent to Officer Smith notifying Officer Smith of the situation.

It should be noted that in the above example only two individuals were discussing the suspect of a crime, however, if multiple individuals were discussing the suspect, then the multiple individuals will be alerted as described above.

In another example, where several dispatch officers would be on a same talkgroup, a patrol officer had a previous conversation with one of the dispatch officers about pulling a vehicle over. The patrol officer does a search using a virtual partner on the private talkgroup and the search results in a warrant for arrest. The alert is sent to the dispatch officer that the patrol officer was previously talking to. The alert would be sent to their terminal with the necessary details for the dispatcher to take appropriate next steps to aid the first responder.

Turning now to the drawings, wherein like numerals designate like components, FIG. 1 depicts an example communication system 100 that intelligently alerts individuals within a public-safety communication system. System 100 includes one or more radio access networks (RANs) 102, a public-safety core network 104, radio 101, computer 114, databases 164, and Virtual-Partner Server 103, and communication links 118 and 124.

RAN 102 includes typical RAN elements such as base stations, base station controllers (BSCs), routers, switches, and the like, arranged, connected, and programmed to provide wireless service to user equipment (e.g., radio 101, and the like) in a manner known to those of skill in the relevant art. RAN 102 may implement a direct-mode, conventional, or trunked land mobile radio (LMR) standard or protocol such as European Telecommunications Standards Institute (ETSI) Digital Mobile Radio (DMR), a Project 25 (P25) standard defined by the Association of Public Safety Communications Officials International (APCO), Terrestrial Trunked Radio (TETRA), or other LMR radio protocols or standards. In other embodiments, RAN 102 may implement a Long Term Evolution (LTE), LTE-Advance, or 5G protocol including multimedia broadcast multicast services (MBMS) or single site point-to-multipoint (SC-PTM) over which an open mobile alliance (OMA) push to talk (PTT) over cellular (OMA-PoC), a voice over IP (VoIP), an LTE Direct or LTE Device to Device, or a PTT over IP (PoIP) application may be implemented. In still further embodiments, RAN 102 may implement a Wi-Fi protocol perhaps in accordance with an IEEE 802.11 standard (e.g., 802.11a, 802.11b, 802.11g) or a WiMAX protocol perhaps operating in accordance with an IEEE 802.16 standard.

Public-safety core network 104 may include one or more packet-switched networks and/or one or more circuit-switched networks, and in general provides one or more public-safety agencies with any necessary computing and communication needs, transmitting any necessary public-safety-related data and communications.

For narrowband LMR wireless systems, core network 104 operates in either a conventional or trunked configuration. In either configuration, a plurality of communication devices is partitioned into separate groups (talkgroups) of communication devices. In a conventional narrowband system, each communication device in a group is selected to a particular radio channel (frequency or frequency & time slot) for communications associated with that communication device's group. Thus, each group is served by one channel, and multiple groups may share the same single frequency (in which case, in some embodiments, group IDs may be present in the group data to distinguish between groups using the same shared frequency).

In contrast, a trunked radio system and its communication devices use a pool of traffic channels for virtually an unlimited number of groups of communication devices (e.g., talkgroups). Thus, all groups are served by all channels. The trunked radio system works to take advantage of the probability that not all groups need a traffic channel for communication at the same time. When a member of a group requests a call on a control or rest channel on which all of the communication devices at a site idle awaiting new call notifications, in one embodiment, a call controller assigns a separate traffic channel for the requested group call, and all group members move from the assigned control or rest channel to the assigned traffic channel for the group call. In another embodiment, when a member of a group requests a call on a control or rest channel, the call controller may convert the control or rest channel on which the communication devices were idling to a traffic channel for the call, and instruct all communication devices that are not participating in the new call to move to a newly assigned control or rest channel selected from the pool of available channels. With a given number of channels, a much greater number of groups may be accommodated in a trunked radio system as compared with a conventional radio system.

Group calls may be made between wireless and/or wireline participants in accordance with either a narrowband or a broadband protocol or standard. Group members for group calls may be statically or dynamically defined. That is, in a first example, a user or administrator may indicate to the switching and/or radio network (perhaps at a call controller, PTT server, zone controller, or mobile management entity (MME), base station controller (BSC), mobile switching center (MSC), site controller, Push-to-Talk controller, or other network device) a list of participants of a group at the time of the call or in advance of the call. The group members (e.g., communication devices) could be provisioned in the network by the user or an agent, and then provided some form of group identity or identifier, for example. Then, at a future time, an originating user in a group may cause some signaling to be transmitted indicating that he or she wishes to establish a communication session (e.g., join a group call having a particular talkgroup ID) with each of the pre-designated participants in the defined group. In another example, communication devices may dynamically affiliate with a group (and also disassociate with the group) perhaps based on user input, and the switching and/or radio network may track group membership and route new group calls according to the current group membership.

Radio 101 serves as a means of communicating over various talkgroups and performing various queries, and may be any suitable computing and communication devices configured to engage in wireless communication with the RAN 102 over the air interface as is known to those in the relevant art. As one of ordinary skill in the art will recognize, multiple radios 101 may exist within system 100, with RAN 102 and network 104 facilitating communication among all radios.

It should also be noted that any one or more of the communication links 118, 124, could include one or more wireless-communication links and/or one or more wired-communication links.

Computer 114 comprises, or is part of a computer-aided-dispatch center, manned by an operator providing necessary dispatch operations. For example, computer 114 typically comprises a graphical user interface that provides the dispatch operator necessary information about public-safety officers.

Many communication devices provide access to electronic digital assistants (or sometimes referenced as "virtual partners") that may provide the user thereof with valuable information in an automated (e.g., without further user input) or semi-automated (e.g., with some further user input) fashion, or provide answers to queries initiated by a user. The valuable information provided to the user may be based on explicit requests for such information posed by the user via an input (e.g., such as a parsed natural language input or an electronic touch interface manipulation associated with an explicit request) in which the electronic digital assistant may reactively provide such requested valuable information, or may be based on some other set of one or more context or triggers in which the electronic digital assistant may proactively provide such valuable information to the user absent any explicit request from the user.

As some existing examples, electronic digital assistants such as Siri provided by Apple, Inc.® and Google Now provided by Google, Inc.®, are software applications running on underlying electronic hardware that are capable of understanding natural language, and may complete electronic tasks in response to user voice inputs, among other additional or alternative types of inputs. These electronic digital assistants may perform such tasks as taking and storing voice dictation for future reference and retrieval, reading a received text message or an e-mail message aloud, generating a text message or e-mail message reply, looking up requested phone numbers and initiating a phone call to a requested contact, generating calendar appointments and providing appointment reminders, warning users of nearby dangers such as traffic accidents or environmental hazards, and providing many other types of information in a reactive or proactive manner.

With the above in mind, virtual-partner server 103 is provided. Server 103 serves to answer queries generated from radio 101, over, for example, a private communication channel/talkgroup. Server 103 comprises a virtual partner (e.g., a microprocessor and natural language processor serving as a virtual partner) that is configured to receive voice data from communications over various talkgroups and keep track of relevant information. For example, for each user of the system, server 103 may track the user's current talkgroup along with conversations for that user. The information is preferably stored in an internal database as text in a digital format.

Server 103 is also configured with a natural language processing (NLP) engine configured to determine the intent and/or content of the any over-the-air voice transmissions received by users. The NLP engine may also analyze oral queries and/or statements received by any user and provide responses (acting as a digital assistant) to the oral queries and/or take other actions in response to the oral statements. It should be noted that any communication between users on the talkgroup will be monitored by the NLP engine in order to determine the content of the over-the-air voice transmission. Oral queries to server 103 are typically done via a private link to server 103 (e.g., a private talkgroup) which comprises just one radio and server 103 as members.

Accordingly, radio 101 may scan from a list of control channels to find the active control channel for the system. Radio 101 may listen on the active control channel for a voice channel assignment that corresponds to a designated talkgroup from the plurality of talk groups. The core network is able to distinguish each radio 101 according to an authentication certificate and with a public key assigned to that particular radio 101. In some embodiments, all talkgroups are assigned to the same voice channel. Alternatively, each of the plurality of talkgroups may be assigned to a different voice channel. Also, a subset of the plurality of talkgroups can share a voice channel.

Figure 2:
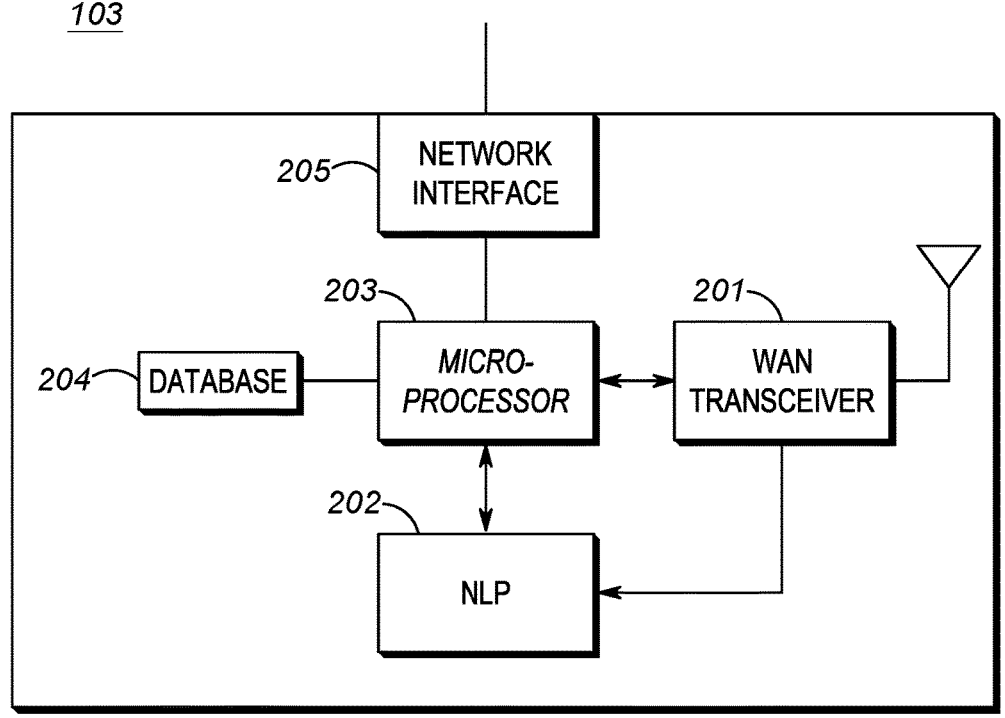
FIG. 2 is block diagram of the server of FIG. 1.

With the above in mind, FIG. 2 sets forth a schematic diagram that illustrates a device 101 for alerting users of system 100. In an embodiment, device 101 serves as virtual-partner server 103, however in alternate embodiments, device 101 may be embodied within computer 114, within the public-safety core network 104, or more computing devices in a cloud compute cluster (not shown), or some other communication device not illustrated in FIG. 1, and/or may be a distributed communication device across two or more entities.

FIG. 2 shows those components (not all necessary) for device 101 to alerting users within a communication system as described above. As shown, device 101 may include a wide-area-network (WAN) transceiver 201 (e.g., a transceiver that utilizes a public-safety communication-system protocol), Natural Language Processor (NLP) 202, logic circuitry 203 (which may serve as a digital assistant), database 24, and network interface 205. In other implementations, device 101 may include more, fewer, or different components. Regardless, all components are connected via common data busses as known in the art.

WAN transceiver 201 may comprise well known long-range transceivers that utilize any number of network system protocols. (As one of ordinary skill in the art will recognize, a transceiver comprises both a transmitter and a receiver for transmitting and receiving data). For example, WAN transceiver 201 may be configured to utilize a next-generation cellular communications protocol operated by a cellular service provider, or any public-safety protocol such as an APCO 25 network or the FirstNet broadband network. WAN transceiver 201 receives communications from al members of all talkgroups, as well as sensor data from all users. It should be noted that WAN transceiver 201 is shown as part of device 101, however, WAN transceiver 201 may be located in RAN 102 (e.g., a base station of RAN 102), with a direct link to device 101.

NLP 202 may be a well known circuitry to analyze, understand, and derive meaning from human language in a smart and useful way. By utilizing NLP, automatic summarization, translation, named entity recognition, relationship extraction, sentiment analysis, speech recognition, and topic segmentation can take place.

Logic circuitry 203 comprises a digital signal processor (DSP), general purpose microprocessor, a programmable logic device, or application specific integrated circuit (ASIC) and is configured to compare a query and/or query results to a past conversation, and alert a user(s) of relevant situations. Logic circuitry and NLP 202 serve as a virtual partner (digital assistant) and may provide the user thereof with valuable information in an automated (e.g., without further user input) or semi-automated (e.g., with some user query) fashion. The valuable information provided to the user may be based on explicit requests (queries) for such information posed by the user via an input (e.g., such as a parsed natural language input or an electronic touch interface manipulation associated with an explicit request) in which the electronic digital assistant may reactively provide such requested valuable information, or may be based on some other set of one or more context or triggers (e.g., providing an alert to radios as described above) in which the electronic digital assistant may proactively provide such valuable information to the user absent any explicit request from the user.

Database 204 comprises standard memory (such as RAM, ROM, . . . , etc) and serves to store traffic channel identification (e.g., a traffic channel ID) along with a summary of what happened to individuals occupying the traffic channel for a predetermined period of time.

Finally, network interface 205 includes elements including processing, modulating, and transceiver elements that are operable in accordance with any one or more standard or proprietary wireless interfaces, wherein some of the functionality of the processing, modulating, and transceiver elements may be performed by means of the processing device 203 through programmed logic such as software applications or firmware stored on database 204 or through hardware. Examples of network interfaces (wired or wireless) include Ethernet, T1, USB interfaces, IEEE 802.11b, IEEE 802.11g, etc.

Storing Prior Conversations

During operation, WAN transceiver 201 will be a member of all talkgroups that wish to have their conversations transcribed and stored. All conversations of the individuals over the various talkgroups are received by WAN transceiver 201 and converted to text by logic circuitry 203/NLP 202. The text-converted conversations are stored as individual audio session records in database 204. As discussed, each audio session record comprises a conversation captured in the past. The audio session record will also include a start time, an end time, identities of active participants, and a speech-to-text transcript of the speech audio exchanged between the individuals between the start and end times.

Determining Importance of a Query or Query Results

As users of system 100 provide queries to server 103, server 103 will access various databases 164 in order to retrieve the requested information. The various databases may be accessed wirelessly through WAN transceiver 201, or via a wired connection using network interface 205. Logic circuitry 203 will access the query search terms and/or the query search results, and determine if any of the search terms and/or results comprise information that is of particular importance. For example, situations where an individual is armed and dangerous, wanted for a crime, has a past history of violence, . . . , etc. may be considered information of particular importance, and requires the notification of other individuals as described above. Other situations of particular importance may include, but are not limited to a license plate query showing an automobile is stolen or used in a crime, any high risk encounters, an outstanding warrant, past violent behavior, past resisting arrest, . . . , etc.

Regardless of whether or not the query search terms and/or results comprise information of particular importance, the query result will be provided to the requestor as natural language, transmitted over WAN transceiver 201.

Determining if any Prior Conversations are Relevant to Query terms and/or Query Results As discussed above, when a query search and/or query search results are of particular importance, logic circuitry 203 will determine if any past conversations are related to the query search and/or query search results. In its simplest form, the query and/or query results are determined to be related to any past conversations if they both comprise similar keywords such as names, addresses, particular crimes, . . . , etc. For example, if Officer Jones and Officer Smith had a prior conversation about an individual named "John Doe", and the query search and/or the query search results contained the name "John Doe", then the past conversation would be considered related to the query and/or query results.

How is Notification Sent

In order for a notification to be sent to an individual, several things need to occur. Specifically, the query and/or query results need to be of particular importance. Additionally, the query and/or the query results need to be relevant to a past conversation (which could be a past conversation among any individuals including or not including conversations had with the query requestor).

When the query and/or query results are of particular importance, and related to a past conversation, then logic circuitry 203 instructs WAN transceiver 201 and/or network interface 205 to alert relevant individuals (i.e., those involved in past conversations related to the query or query results) of the query and/or search results that are currently being provided to a requestor. The notification is not broadcast to all users, but comprise a private transmission (e.g. over a private traffic channel or network connection). The notification comprises information such as, but not limited to the name of the person performing the query and the query results. Other information may be provided, such as the location of the individual who performed the query.

In an alternate embodiment of the present invention, the notification may comprise a quick summary of a situation, for example "Officer Smith has just apprehended John Doe, wanted for murder."

As described above, the apparatus shown in FIG. 2 comprises an over-the-air transceiver 201 configured to receive over-the-air transmissions comprising conversations among various individuals. Database 204 is provided, and configured to store the conversations and identities of participants of the conversations. Logic circuitry 203 is provided, and configured to receive a query, determine query results, determine that the query and/or the query results are of importance, determine that a stored conversation is relevant to the query and/or the query results, determine participants of the stored conversation, and send a notification to the participants of the stored conversation.

As discussed above natural-language processor 202 is provided, and configured to transcribe the received over-the-air conversations into a text representation of the conversation, and wherein the logic circuitry is also configured to determine participants of the conversation, and store the text representation of the conversation along with the participants of the conversation within the database.

As discussed above, the query may be received via an over-the-air private channel, and the logic circuitry determines that the query and/or the query results are of importance by determining that certain key words exist within the query and/or the query results.

Additionally, the logic circuitry may determine that the stored prior conversation is relevant to the query and/or the query results by determining that certain keywords exist in both the query/query results and the stored prior conversation.

Additionally, the notification may comprise the certain keywords.

Additionally, the logic circuitry may send the notification to the participants of the prior conversation by sending a private message via the transceiver to the participants of the prior conversation. The private message may be sent utilizing WAN transceiver 201 and/or network interface 205.

Figure 3:
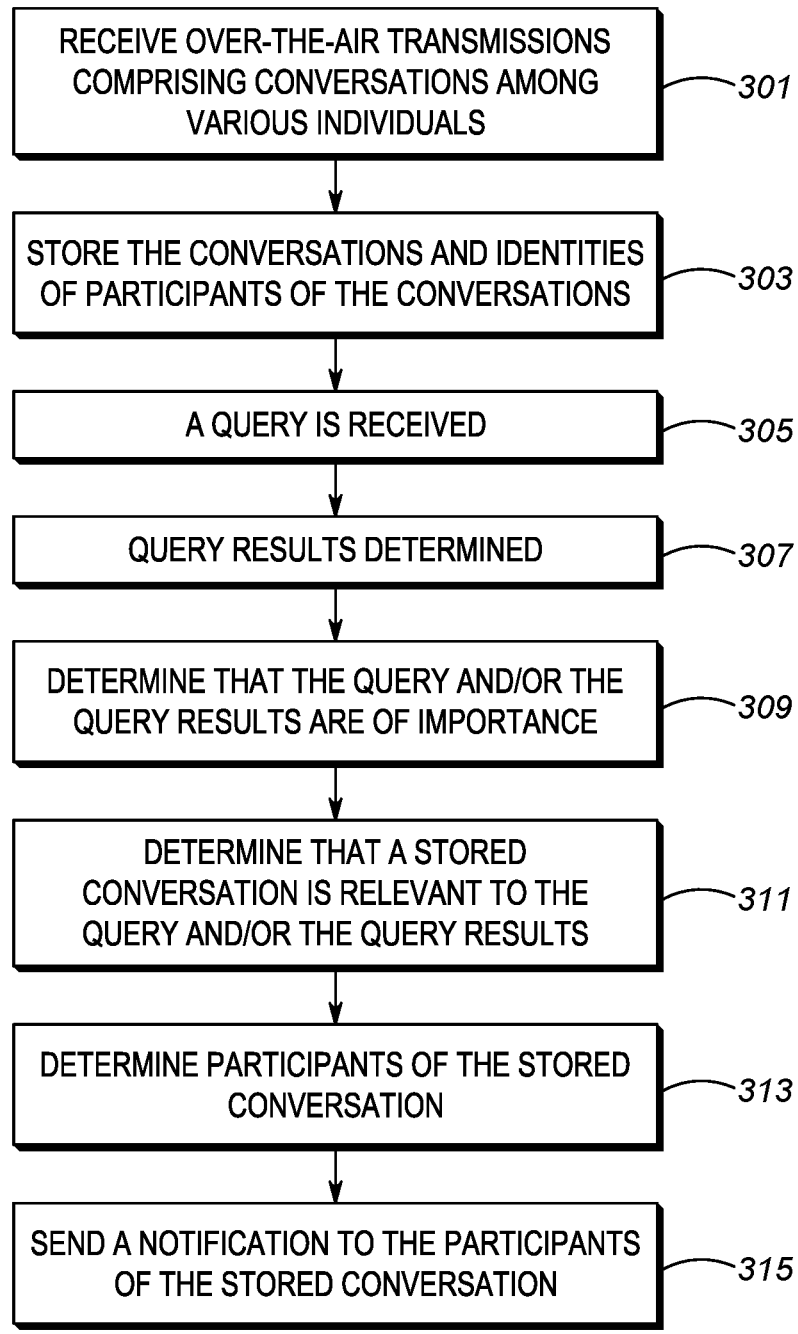
FIG. 3 is a flow chart showing operation of the server of FIG. 2.

FIG. 3 is a flow chart showing operation of server 103. The logic flow begins at step 301 where WAN transceiver 201 receives over-the-air transmissions comprising conversations among various individuals and stores the conversations and identities of participants of the conversations (step 303). At step 305 a query is received by logic circuitry 203, and query results determined (step 307). The query results may be determined by accessing any number of known databases, such as a department-of-motor-vehicles database.

At step 309 logic circuitry 203 determines that the query and/or the query results are of importance, determines that a stored conversation is relevant to the query and/or the query results (step 311), and determines participants of the stored conversation (step 313). Finally, at step 315, logic circuitry 203 sends a notification to the participants of the stored conversation. As discussed, the notification may be sent via WAN transceiver 201 or network interface 205.

As discussed above, the step of storing the conversations may comprise the steps of transcribing the received over-the-air conversations into a text representation of the conversation by utilizing processor 202, determining participants of the conversation, and storing the text representation of the conversation along with the participants of the conversation.

As discussed, the step of receiving the query may comprise the step of receiving the query via an over-the-air private channel.

As discussed, the step of determining that the query and/or the query results are of importance may comprise the step of determining that certain key words exist within the query and/or the query results.

Additionally, the step of determining that the stored prior conversation is relevant to the query and/or the query results may comprise the step of determining that certain keywords exist in both the query/query results and the stored prior conversation. As discussed, the notification may comprise the certain keywords.

The step of sending the notification to the participants of the prior conversation may comprise the step of sending a private message to the participants of the prior conversation.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of the present teachings.

Those skilled in the art will further recognize that references to specific implementation embodiments such as "circuitry" may equally be accomplished via either on general purpose computing apparatus (e.g., CPU) or specialized processing apparatus (e.g., DSP) executing software instructions stored in non-transitory computer-readable memory. It will also be understood that the terms and expressions used herein have the ordinary technical meaning as is accorded to such terms and expressions by persons skilled in the technical field as set forth above except where different specific meanings have otherwise been set forth herein.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising the steps of:
   receiving over-the-air transmissions comprising conversations among various individuals;
   storing the conversations and identities of participants of the conversations;
   receiving a query;
   determining query results;
   determining that the query and/or the query results are of importance;
   determining that a stored conversation is relevant to the query and/or the query results;
   determining participants of the stored conversation; and
   sending a notification to the participants of the stored conversation;
   wherein the step of sending the notification to the participants of the conversation comprises the step of sending a private message to the participants of the conversation.

2. The method of claim 1 wherein the step of storing the conversations comprises the steps of:
   transcribing the received over-the-air conversations into a text representation of the conversation;
   determining participants of the conversation;
   storing the text representation of the conversation along with the participants of the conversation.

3. The method of claim 1 wherein the step of receiving the query comprises the step of receiving the query via an over-the-air private channel.

4. The method of claim 1 wherein the step of determining that the query and/or the query results are of importance comprises the step of determining that certain key words exist within the query and/or the query results.

5. The method of claim 1 wherein the step of determining that the stored conversation is relevant to the query and/or the query results comprises the step of determining that certain keywords exist in both the query/query results and the stored conversation.

6. The method of claim 5 wherein the notification comprises the certain keywords.

7. An apparatus comprising
   an over-the-air transceiver configured to receive over-the-air transmissions comprising conversations among various individuals;
   a database configured to store the conversations and identities of participants of the conversations;
   logic circuitry configured to receive a query, determine query results, determine that the query and/or the query results are of importance, determine that a stored conversation is relevant to the query and/or the query results, determine participants of the stored conversation, and send a notification to the participants of the stored conversation;
   wherein the logic circuitry sends the notification to the participants of the conversation by sending a private message via the transceiver to the participants of the conversation.

8. The apparatus of claim 7 further comprising a natural-language processor configured to transcribe the received over-the-air conversations into a text representation of the conversation, and wherein the logic circuitry is also configured to determine participants of the conversation, and store the text representation of the conversation along with the participants of the conversation within the database.

9. The apparatus of claim 7 wherein the query is received via an over-the-air private channel.

10. The apparatus of claim 7 wherein the logic circuitry determines that the query and/or the query results are of importance by determining that certain key words exist within the query and/or the query results.

11. The apparatus of claim 7 wherein the logic circuitry determines that the stored conversation is relevant to the query and/or the query results by determining that certain keywords exist in both the query/query results and the stored conversation.

12. The apparatus of claim 11 wherein the notification comprises the certain keywords.

13. A method comprising the steps of:
   receiving over-the-air transmissions comprising conversations among various individuals;
   storing the conversations and identities of participants of the conversations;
   receiving a query;
   determining query results;
   determining that the query and/or the query results are of importance;
   determining that a stored conversation is relevant to the query and/or the query results;
   determining participants of the stored conversation;
   sending a notification to the participants of the stored conversation;
   wherein the step of storing the conversations comprises the steps of:
      transcribing the received over-the-air conversations into a text representation of the conversation;
      determining participants of the conversation;
      storing the text representation of the conversation along with the participants of the conversation;
   wherein the step of receiving the query comprises the step of receiving the query via an over-the-air private channel;
   wherein the step of determining that the query and/or the query results are of importance comprises the step of determining that certain key words exist within the query and/or the query results;
   wherein the step of determining that the stored conversation is relevant to the query and/or the query results comprises the step of determining that certain keywords exist in both the query/query results and the stored conversation;

wherein the notification comprises the certain keywords; and wherein the step of sending the notification to the participants of the conversation comprises the step of sending a private message to the participants of the conversation.

\* \* \* \* \*